UNITED STATES PATENT OFFICE.

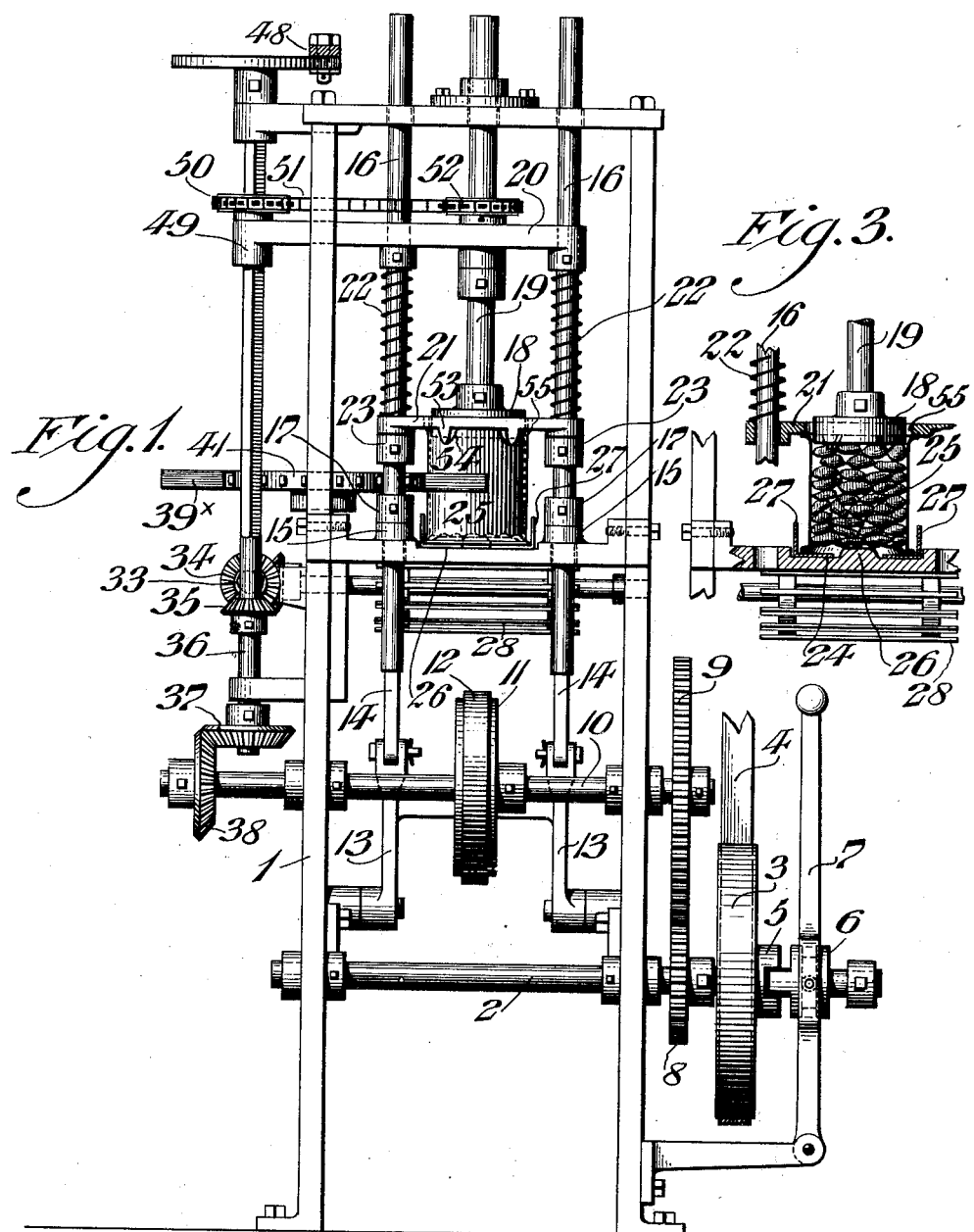

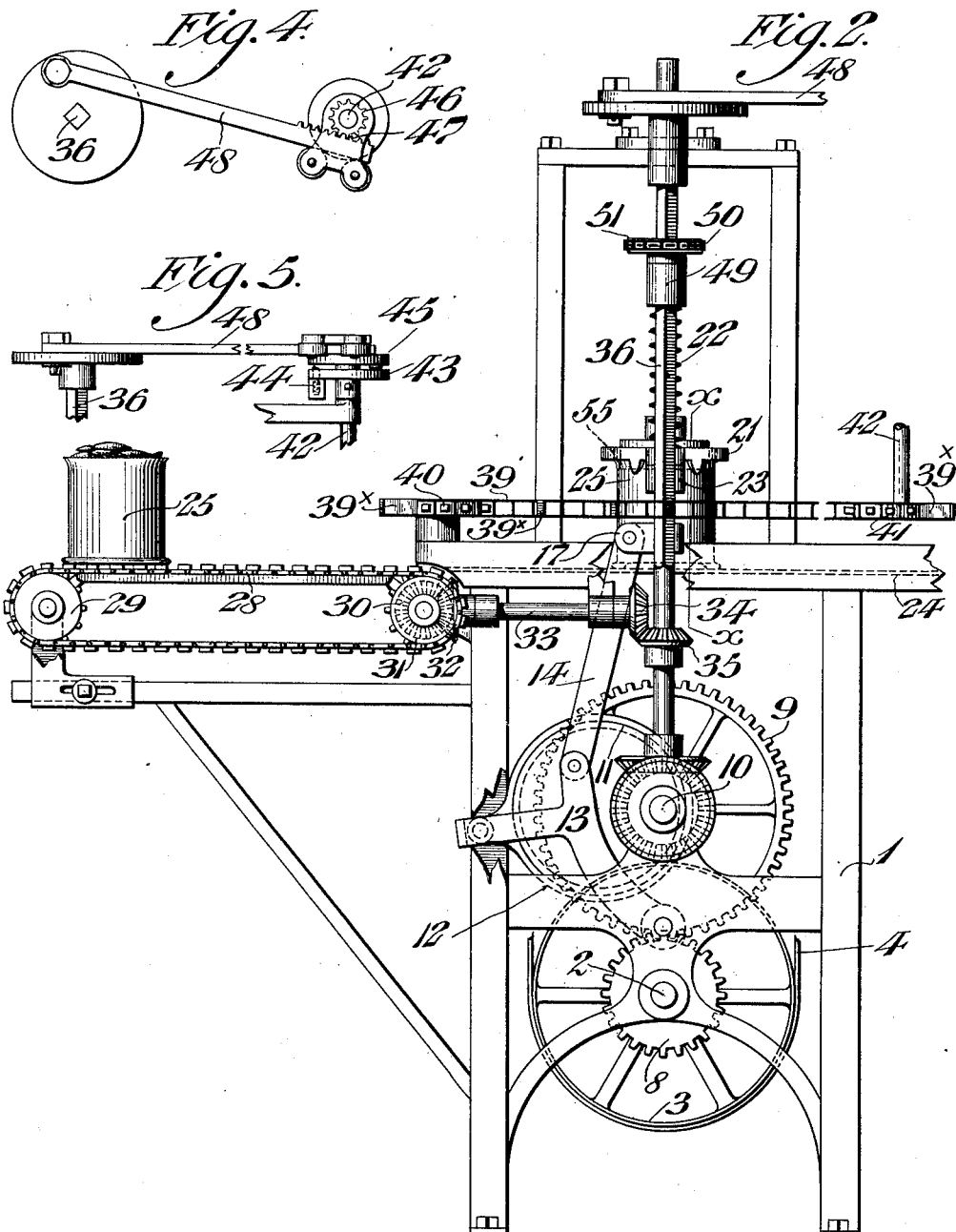

GEORGE W. STEELMAN AND EZRA H. SAWYER, OF VINELAND, NEW JERSEY, AND MAURICE FELS, OF PHILADELPHIA, PENNSYLVANIA, ASSIGNORS TO NIPPER MACHINE COMPANY, OF NORMA, NEW JERSEY, A CORPORATION OF NEW JERSEY.

CANNING-MACHINE.

1,100,333. Specification of Letters Patent. Patented June 16, 1914.

Application filed November 20, 1913. Serial No. 802,102.

*To all whom it may concern:*

Be it known that we, GEORGE W. STEELMAN and EZRA H. SAWYER, both citizens of the United States, residing at Vineland, in the county of Cumberland, State of New Jersey, and MAURICE FELS, a citizen of the United States, residing in the city and county of Philadelphia, State of Pennsylvania, have invented a new and useful Canning-Machine, of which the following is a specification.

Our invention relates to a new and useful improvement in canning machines and consists of means for pressing and reaming the material in a can, and means for preventing the adhering of the material to the pressing means.

It further consists of a plunger adapted to be raised and lowered, in order to press and ream the material in a can, and means for imparting rotary motion to said plunger, whereby the material is prevented from adhering to said plunger.

It further consists of other novel features of construction, all as will be hereinafter fully set forth.

For the purpose of illustrating our invention, we have shown in the accompanying drawings one form thereof which is at present preferred by us, since the same has been found in practice to give satisfactory and reliable results, although it is to be understood that the various instrumentalities of which our invention consists can be variously arranged and organized, and that our invention is not limited to the precise arrangement and organization of these instrumentalities as herein shown and described.

Figure 1 represents an end elevation of a canning machine, embodying our invention. Fig. 2 represents a side elevation thereof, with certain parts broken away for the sake of clearness. Fig. 3 represents a sectional view on line x—x Fig. 2, with certain parts omitted. Fig. 4 represents a plan view, showing a portion of the mechanism on a reduced scale. Fig. 5 represents a side elevation of the mechanism shown in Fig. 4.

Similar numerals of reference indicate corresponding parts in the figures.

Referring to the drawings:—1 designates the frame of a machine, which is of any suitable style or construction, on which is suitably mounted a power shaft 2, to which motion is imparted in any suitable manner, as here shown, by a pulley 3, to which power is imparted by a belt 4, from any suitable source. The pulley 3, as here shown, is mounted on a loose member 5 of a clutch, with which is adapted to engage a fixed member 6 thereof, which is keyed or otherwise suitably connected with the power shaft 2, said fixed member being in suitable engagement with a lever 7, for operation of the same.

8 designates a gear mounted on the power shaft 2, which is in mesh with a gear 9 on the countershaft 10, which carries an eccentric 11, around which is a strap 12, which is pivotally connected in any suitable manner with a toggle mechanism, which, as here shown, consists of the lever arms 13 pivotally mounted at one end to the frame 1 of the machine, and each arm 13 of which is connected at its opposite end with a link 14, each of which is pivotally connected with a collar or hub 17, which embrace and are adjustably secured to the rods 16, which latter are guided in a suitable portion of the frame 1 of the machine, and which collars 17 abut the bosses 15 of the frame 1 which bosses 15 serve as additional bearing surface for the rods 16. As the toggle lever mechanism is actuated by the strap 12, the collars 17 will be raised and lowered carrying with them the rods 16.

18 designates a plunger on the plunger rod 19, which is in suitable connection with a bar 20, which is secured in any suitable manner to the rods 16, whereby it will be understood that the raising and lowering of the rods 16 carries with them the bar 20 and so the plunger 18.

21 designates a guide, preferably formed as a ring, through the opening 55 of which a plunger is adapted to pass, which guide is provided with suitable sleeves, which movably embrace the rods 16 and against the upper face of which bear the springs 22, which surround the rods 16 and the upper ends of which springs bear against the connecting means of the bar 20, whereby it will be understood that the said guide is resiliently held in proper position, but relative movement between the same and the rods 16 is permitted. To prevent the improper downward movement of the guide 21, we preferably desire to secure the bosses 23 on the rods 16, which serve to hold the guide 21 in its proper position, and this position may be adjusted by adjusting the position of the bosses 23 on the said rods 16.

24 designates a track suitably carried by the frame 1 and in suitable location with respect to the plunger 18, said track being of any suitable form in order to receive and guide the cans 25 in their passage through the machine and to locate the same in their proper position beneath the plunger 18. As here shown, said tracks are formed with the upwardly extending lug or support 26, which is adapted to enter the depression in the bottom of the can substantially in the median line of the plunger so that the bottom of the can at this point will be suitably supported when the material is being pressed and reamed by the plunger. In order to bring the cans 25 to the track 24, we preferably desire to employ a conveyer, such as an endless chain or belt 28, which passes around suitable sprockets 29 and 30, one of which, as 30, being provided with a suitable bevel gear 31, meshing with a beveled gear 32, carried on the shaft 33, which is provided at a suitable point with a beveled gear 34, which meshes with a beveled gear 35 mounted on the shaft 36, to which motion is imparted through a beveled gear 37, meshing with the beveled gear 38 carried by the countershaft 10, by which means, it will be understood that the said shaft 36 is rotated and imparts motion to the gear 30, and so to the conveyer 28, which latter, it will be understood, is so positioned in order that the cans 25 will be delivered therefrom to the track 24. In order to impart suitable movement to the cans to carry the same intermittently through the machine after they leave the conveyer, we provide a belt or chain 39, which passes around suitable sprockets 40 and 41, which are suitably supported, said belt or chain being provided with a plurality of extending arms $39^x$, at suitable intervals, so that as the chain is moved, the arms will strike or engage with a can and carry the same to a position beneath the plunger 18, the raising and lowering mechanism of which being so timed that when the can is in position beneath the plunger, the same is lowered to bring the same in engagement with the material in the can, as is seen in Fig. 3.

Suitable means is employed in order to impart intermittent movement to the chain or belt 39, and as here shown, we have mounted the sprocket 41 upon a shaft 42, upon which is mounted a disk 43, carrying the dog or pawl 44, which is adapted to engage with, at the proper time, a suitable portion of a disk 45, which carries a sprocket wheel 46, which is in suitable engagement with the teeth of a rack 47, carried on the rod 48, which is eccentrically connected with the shaft 36, whereby it will be understood that as the shaft 36 is rotated, the bar 48 is moved backward and forward causing the dog or pawl 44 to engage with the disk 45 in one direction of movement of the bar 48 and pass the same in the reverse movement of the said bar to impart an intermittent rotary movement of the shaft 42, and thus to the chain 39. At a suitable point in its extent, the shaft 36 is formed angularly and receives a hub 49 carried by a bar 20, with which the plunger is connected, said hub 49 being guided by said shaft 36 but permitting free rotation of the said shaft. Supported upon the hub 49 and in engagement with the angular portion of the shaft 36 is a sprocket wheel 50, around which passes a chain or driving mechanism 51, which also passes around a suitable sprocket 52, or other suitable device, mounted on the plunger rod 19, whereby it will be understood that as the shaft 36 rotates, the chain or belt 51 is suitably driven, imparting rotary movement to the plunger shaft 19 and so the plunger 18, and the said driving mechanism is suitably connected with the plunger and operating parts therefor, in order that as the said plunger 18 is raised and lowered, the driving mechanism, for imparting rotary movement thereto, will be raised and lowered at the same time.

It will be understood that the guide 21 is so formed that the opening 55 suitably permits the plunger to contact with the material in the can and that the wall around the opening is positioned to engage with the upper edge of the can and rest thereupon. In order to obtain the proper register of the guide 21 with the can, we have provided the depending fingers 53, at suitable points around the guide 21, having the inclined inner faces 54, which engage with the can and insure that it is in proper position with respect to the guide 21, as will be evident.

The operation of the device is as follows: A can 25 filled with material is placed upon the conveyer 28 and by suitable connection of the clutch members 5 and 6, motion is imparted to the shaft 2 and through the medium of the gears 8 and 9 to the countershaft 10. This imparts movement to the eccentric 11 which is connected to the eccentric strap 12, to operate the toggle mechanism formed by the bar 13 and links 14, to raise and lower the rods 16, carrying with them the plunger 18. At the same time, motion is imparted to the shaft 36 from the said countershaft 10, so that the cans on the conveyer 28 are moved forwardly upon the track 24 at which time, one of the arms $39^x$ on the chain or belt 39 engages therewith and moves the can to a position beneath the plunger 18, at which time, the raising and lowering mechanism is so timed, that the plunger contacts with the material in the can to suitably press the same and at the same time, the rotary movement is imparted to the plunger 18, so that the same rotates at a suitable speed and in contact with the material, preventing the same from sticking or adhering to the said plunger 18. When the plunger is elevated again, the can is moved forwardly out of the machine and the next succeeding can is brought to a position beneath the plunger 18. The guide, 21, it will be understood, can be moved downwardly to a position resting upon the top of the can, and by reason of the springs 22, the said guide 21 will not be pressed downward beyond the proper point, even when the bar 20 and plunger 18 move downwardly, a further suitable distance to press the material below the top of the can, since the guide 21 being engaged upon the upper edge of the can will rest there and the springs will be compressed a suitable amount by the bar 20, permitting the guide 21 to rest upon the upper edge of the can, without undue or improper strain.

From the above, it will be understood that we have provided means for lowering the plunger to bring the same into suitable engagement with the material in the can, and we have provided means for imparting a rotary motion to the plunger, while in contact with the material to prevent the material from adhering thereto. We have found that this is a very considerable advantage over the machines heretofore in use, where the plunger is simply raised and lowered, since by this old construction, we have found, in actual practice, that the material would adhere to the plunger, causing a loss of the material and at the same time, in some instances, impairing the appearance of the material in the can. By our construction, these difficulties are avoided and an improved product is obtained with a saving in the amount of the same.

It will now be apparent that we have devised a novel and useful construction of a canning machine which embodies the features of advantage enumerated as desirable in the statement of the invention and the above description, and while we have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described our invention, what we claim as new and desire to secure by Letters Patent, is:—

1. In a device of the character stated, means for supporting a can, means for carrying the same through the machine, a plunger suitably mounted, means for raising and lowering said plunger to bring the same into suitable engagement with the material in the can, and means for imparting rotary motion to said plunger while in contact with the material.

2. In a device of the character stated, means for supporting a can, means for carrying the same through the machine, a plunger, means for raising and lowering said plunger to bring the same into suitable engagement with the material in the can, and means for imparting rotary motion to said plunger, whereby when brought into contact with the material, the latter is prevented from adhering to said plunger.

3. In a device of the character stated, means for supporting a can, means for carrying the same through the machine, a plunger, means for raising and lowering said plunger to bring the same into suitable engagement with the material in the can, and means for imparting relative rotary movement between said plunger and said can for preventing the material from adhering to said plunger.

4. In a device of the character stated, means for supporting a can, means for carrying the same through the machine, a plunger, means for raising and lowering said plunger, a guide for said plunger, and driving mechanism for rotating said plunger.

5. In a device of the character stated, means for supporting a can, means for carrying the same through the machine, a plunger, means for raising and lowering said plunger, driving mechanism for rotating said plunger, and connections whereby said driving mechanism is raised and lowered with said plunger.

GEORGE W. STEELMAN.
EZRA H. SAWYER.
MAURICE FELS.

Witnesses:
S. FRED SHORT,
JAMES F. ALLEN.